Feb. 9, 1937. R. A. STEVENSON Re. 20,261

WATER PURIFICATION PROCESS

Original Filed July 21, 1931

INVENTOR.
Ralph A. Stevenson

BY Robert H. Eckhoff
ATTORNEY

Reissued Feb. 9, 1937

Re. 20,261

UNITED STATES PATENT OFFICE 20,261

WATER PURIFICATION PROCESS

Ralph A. Stevenson, San Marino, Calif., assignor to Great Western Electro-Chemical Co., San Francisco, Calif., a corporation of California Original No. 1,946,818, dated February 13, 1934, Serial No. 552,290, July 21, 1931. Application for reissue July 30, 1935, Serial No. 33,867

15 Claims. (Cl. 210—28)

This invention relates to purification of water by precipitation of suspended organic and colloidal matter and the object of the invention is to provide an improved process for carrying this out.

As is well known alum, aluminum, sulfate, ferric sulfate, ferric chloride, chlorinated copperas, and similar materials are used extensively as treating agents in water purification systems. The alum (or other material) is added to the water in the amount necessary to bring about coagulation or flocculation of the colloidal and suspended matter in the water.

The coagulating properties of aluminum and iron salts seem to depend largely upon the fact that colloidal and suspended matter in water nearly always carries a negative electrical charge. This negative charge is thought to keep the particles apart by mutual repellent action. Adsorption on the colloidal and/or suspended particles of positively charged ions, such as $Fe^{+++}$ and $Al^{+++}$, neutralizes their charge and causes them to coalesce into agglomerates large enough to settle under the force of gravity.

I have discovered that if settled sludges from the treatment of water with aluminum and/or iron salts are subjected to the action of certain chemicals the particles acquire a positive charge, and the resultant material forms a superior coagulating agent exceeding in effectiveness that of the customary coagulants, such as iron and aluminum salts. For the purpose of imposing an electrical charge on the particles in question, I am not concerned with electrical means, however, but solely with chemical means as carried out by treatment with certain chemicals.

Chlorination of the sludge appears to be the best method for imparting the charge to the particles of sludge. This is especially the case in sludges high in iron and aluminum, for example those previously mentioned as resulting from the treatment of water with iron and aluminum salts. Chlorination is, however, also effective as a means of positively charging other types of sludges and other finely divided solid materials.

The chlorination should usually be done in an enclosed system so as to prevent loss of chlorine gas. It may be carried out either in a batch or a continuous process, the time factor being properly regulated in all cases to secure the desired degree of chlorination. The chlorination may be either partial or complete. Partial chlorination is preferable in most cases. The time necessary to secure a given degree of chlorination depends upon the temperature, and the character of the material being chlorinated.

Figure 1:
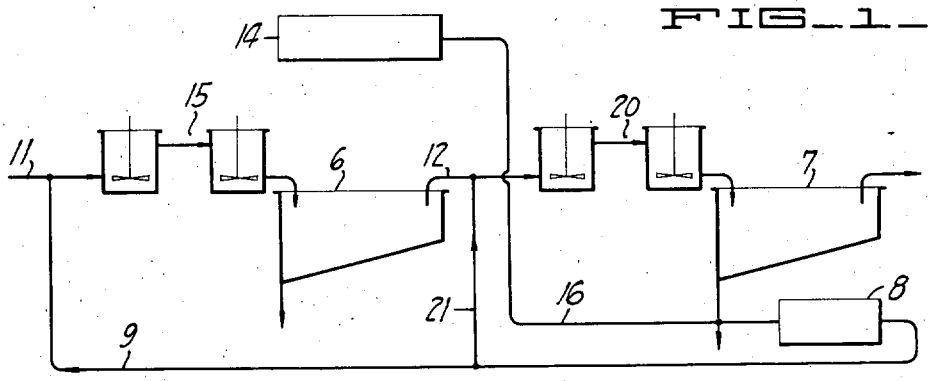
Figure 2:
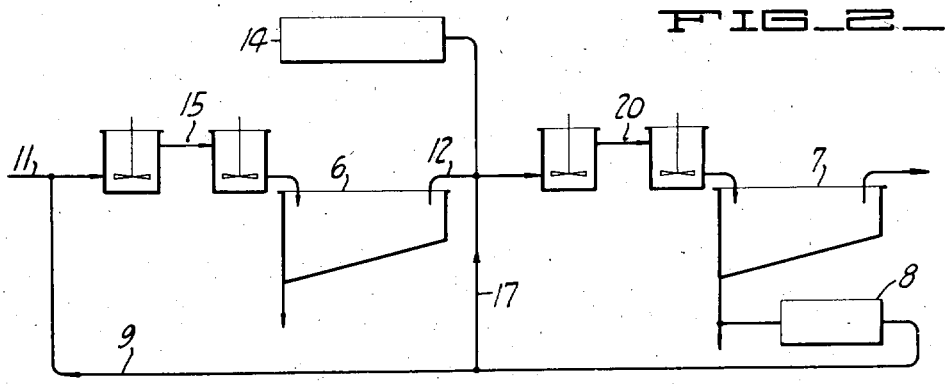
Figure 3:
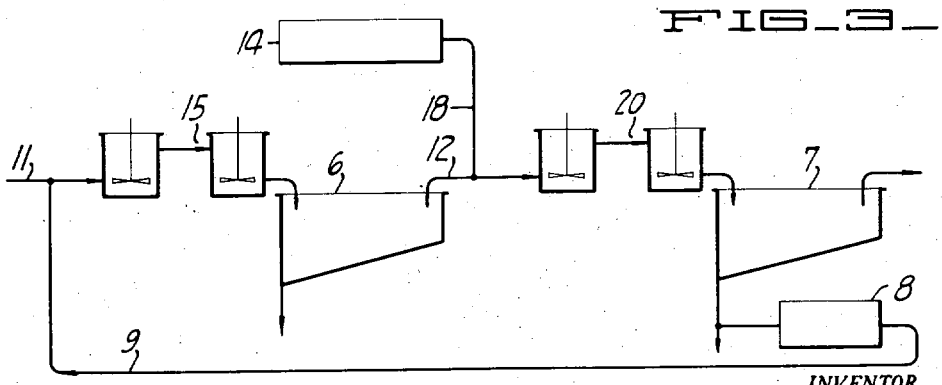

In some cases it may be found advantageous to use the chlorinated sludge in conjunction with other coagulants, e. g. ferric chloride and/or aluminum chloride. In such cases, the heavy metal salt, either dry or in solution, may be added to the sludge before chlorination (Figure 1), added to the sludge after chlorination (Figure 2), or added separately to the water being treated (Figure 3).

A typical application of the invention is as follows:

In the drawing the three figures are diagrams representing forms of the process.

The settled sludge containing about 20% solids from water which has been treated with alum in the usual way is removed from the settling tanks 6 and 7 to a suitable apparatus 8 and chlorinated as by bubbling chlorine through it until it has absorbed about 1% by weight of the gas. After chlorination the chlorinated sludge is used to treat water in a manner similar to that in which the alum was originally used, that is by addition and trituration in mixers 15 and 20, the amount required depending on the condition of the water. Thus, the chlorinated sludge is returned through line 9 to be admixed in suitable equipment with entering water in inlet 11 as well as added through line 21 to line 12 carrying partly clarified water to tank 7. As explained above, another coagulant from supply 14 can be added through line 16 to the sludge before chlorination (Figure 1), added to the sludge through line 17 after chlorination (Figure 2), or added separately through line 18 to the water being treated. This alternativeness is indicated in the drawing.

The sludge which forms from this treatment may again be removed and chlorinated as described and again used for water treatment. With certain types of waters, this cycle may be repeated indefinitely. In other cases the sludge may be discarded after being used only once. In still other cases, the sludge may be treated to recover certain of its constituents. In my appended claims, the words "water purification" shall be understood as meaning not only ordinary water treatment, but also the treatment of other aqueous mediums, for example, sewage, dye plant wastes, and various other industrial colloidal suspensions. The word "sludge" shall be understood as meaning any suspension or mixture of finely divided solid materials which has been precipitated or derived from an aqueous medium.

Among the advantages of the above method of treatment are the following:

1. The cost of the treated sludge is much less than that of the usual treating agents for equal coagulating value.

2. A minimum amount of undesirable soluble matter is introduced.

3. A marked sterilizing action is effected in the treated water or other solution.

4. The particles of the coagulum are coarser and settle more rapidly.

5. The floc produced is much more rugged than that produced with other coagulants and does not break down on agitation.

6. The time necessary to bring about coagulation is less than with other coagulants and the purification plant may be correspondingly smaller for the same capacity.

7. The process does not require aeration since it does not depend upon aerobic conditions for success. This is a feature of my process since it simplifies installation as well as operation cost—it also distinguishes my process from what has been done before. For example in British Patent 305,717 (accepted February 11, 1929) Dallyn uses a sludge return but the sludge must be thoroughly aerated since Dallyn depends upon aerobic conditions for operation of his process. In the claims anaerobic is used as excluding the aeration of Dallyn.

I claim:

1. The process of water purification which includes the successive steps of chlorination of a settled sludge removed from a body of water and the application of such chlorinated sludge to the precipitation of undesirable suspended matter in water.

2. The process of water purification which includes the successive steps of chlorination of a settled sludge and the application of such chlorinated sludge to the precipitation of undesirable suspended matter in water followed by removal of the sludge thus precipitated from the water and re-chlorination of the removed sludge for re-application to the precipitation of undesirable suspended matter in water.

3. The process of water purification which includes the successive steps of chlorination of sludge removed from a body of aqueous media and the application of such chlorinated sludge together with other coagulants to the precipitation of undesirable suspended matter in water.

4. The process of water or sewage purification which comprises introducing and agitating into the aqueous body metallic compounds adapted to form a sludge with the undesirable suspended matter, removing part of the settled sludge to a separate container, chlorinating the removed sludge with free chlorine, and reapplying it to the aqueous body while continually introducing further aqueous media to be treated.

5. A process for treating water to remove a sludge therefrom which includes the step of admixing with raw water a chlorinated settled sludge, derived by treatment, in a chlorination stage, of sludge forming material contained in a settled sewage sludge removed from a body of water.

6. A process for treating water to purify the same by employing substantially only coagulants, said process consisting essentially in admixing, with a raw water a settled sludge derived by treatment in a chlorination stage of sludge forming material removed from a body of water, under substantially anaerobic conditions to settle a mixture of a raw sludge and said treated sludge from said water.

7. A process for treating sewage to settle sludge therefrom including adding and mixing with said sewage a settled sewage sludge removed from a body of water and treated with a chlorinating agent.

8. A process for treating sewage to settle sludge therefrom consisting essentially in mixing with raw sewage a settled sewage sludge removed from a body of water and treated with chlorine under substantially anaerobic conditions.

9. A process of water treatment comprising adding a metal salt coagulant to water to carry out of said water a sludge, settling a sludge from said water, removing the settled sludge, chlorinating at least a portion of said settled sludge, and utilizing said chlorinated sludge to treat additional water.

10. The process of water purification which includes the separate chlorination of sludge removed from a body of aqueous media and the application of such separately chlorinated sludge to the precipitation of undesirable suspended matter in water.

11. The process of water purification which includes the separate chlorination of sludge removed from a body of aqueous media and the application of such separately chlorinated sludge to the precipitation of undesirable suspended matter in water followed by removal of the sludge thus precipitated from the media and re-chlorination of the separated sludge for re-application to the precipitation of undesirable suspended matter in water.

12. The process of water purification which includes the separate chlorination of sludge removed from a body of aqueous media and the application of such separately chlorinated sludge together with other coagulants to the precipitation of undesirable suspended matter in water.

13. The process of water purification which includes separating a sludge from a body of water, contacting said separated sludge with free chlorine and returning the chlorinated sludge to water to precipitate suspended matter in the water.

14. The process of water purification which includes precipitating a sludge from water with a metal salt coagulant, separating said sludge from the water, contacting said separated sludge with free chlorine to chlorinate said metal salt, and returning said chlorinated sludge to contact additional water.

15. Sludge precipitated from impure water or sewage by a metal salt coagulant and thereafter removed from the water or sewage and treated with free chlorine.

RALPH A. STEVENSON.